United States Patent

Goldman et al.

Patent Number: 6,153,258
Date of Patent: Nov. 28, 2000

[54] OPTICAL FIBER REJACKETING METHOD, APPARATUS AND PRODUCT OBTAINED THEREBY

[75] Inventors: Arnold E. Goldman, Calabasas; Henry C. Abbink, Westlake Village; Daryl K. Sakaida, Oak Park, all of Calif.

[73] Assignee: Litton Systems, Inc., Woodland Hills, Calif.

[21] Appl. No.: 09/126,961

[22] Filed: Jul. 31, 1998

[51] Int. Cl.[7] .............. B05D 1/40; B05D 1/26; G02B 6/255
[52] U.S. Cl. .............. 427/163.2; 385/95; 385/99
[58] Field of Search .............. 427/163.2; 385/95, 385/99; 156/49, 158, 304.1, 304.2; 403/305, 341

[56] References Cited

U.S. PATENT DOCUMENTS

| | | | |
|---|---|---|---|
| 4,389,428 | 6/1983 | McDuffee et al. | 427/513 |
| 4,475,935 | 10/1984 | Tanaka et al. | 65/407 |
| 4,915,990 | 4/1990 | Chang | 428/34.9 |
| 5,022,735 | 6/1991 | Dahlgren | 385/99 |

*Primary Examiner*—Shrive Beck
*Assistant Examiner*—Michael Cleveland
*Attorney, Agent, or Firm*—Lewis B. Sternfels

[57] ABSTRACT

The fiber jacket application system is used to provide a protective jacket over spliced optical fibers (10, 12), such as to coat a length of bare fiber, previously coated fiber, and particularly to rejacket a length of fiber in which the jacket was removed for splicing. Curable jacketing material is twice fed from a reservoir (28) through a small orifice or syringe (32) onto the respective sides of bared portions (10d, 12d) of the fiber. A first material (14) is deposited from and between the existing jackets (10a, 12a) and onto essentially half of the bared portions. A second material (16) is deposited in bonded contact with the first applied material from and between the surrounding protective jackets and onto essentially the remaining half of the bared portions.

7 Claims, 2 Drawing Sheets

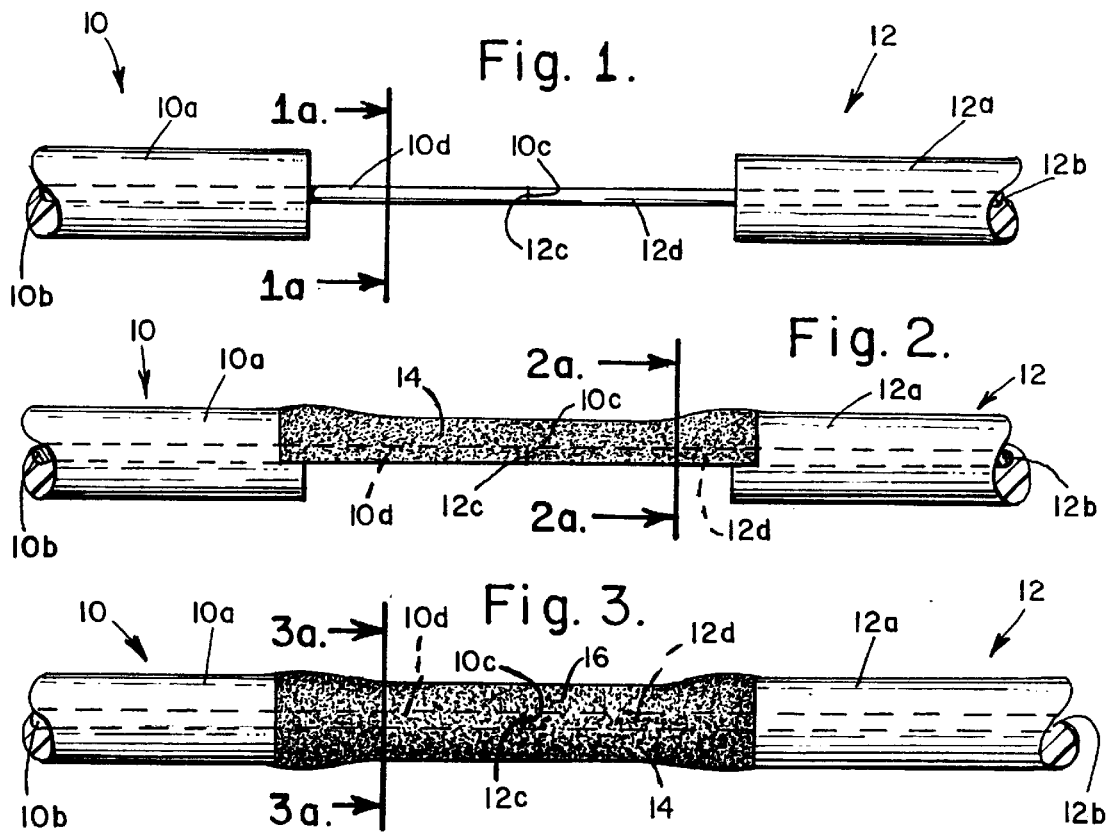
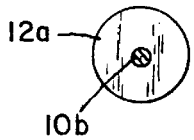
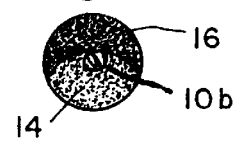
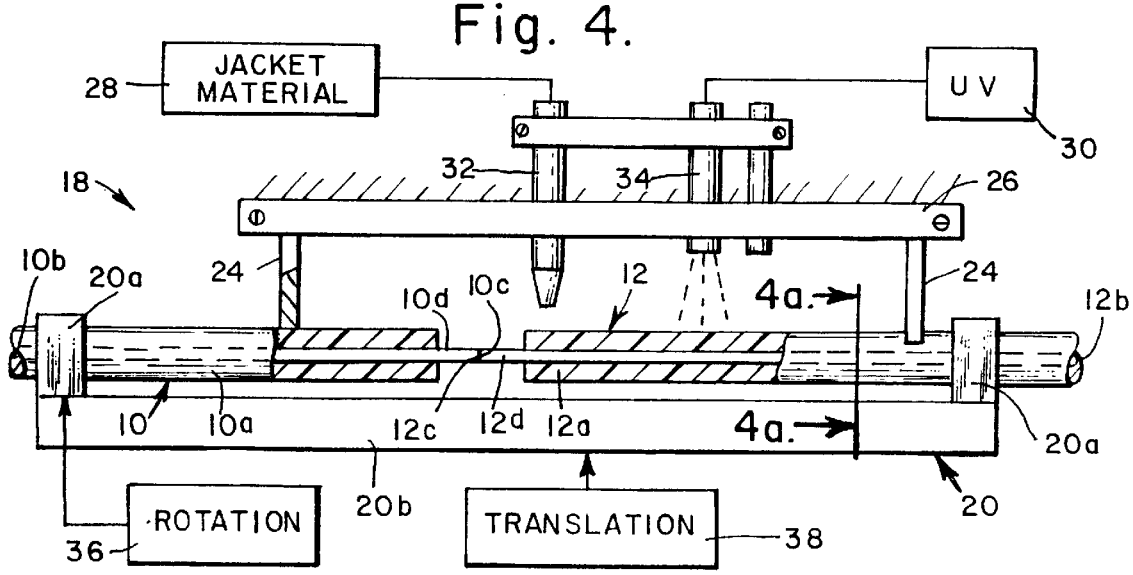

OPTICAL FIBER REJACKETING METHOD, APPARATUS AND PRODUCT OBTAINED THEREBY

REFERENCE REGARDING FEDERAL SPONSORSHIP

This invention was made with support under Contract No. F33615-93-C-4321 awarded by the U.S. Department of the Air Force, Wright Patterson Air Force Base. The Government of the United States of America has certain rights in this inventions.

CROSS-REFERENCE TO RELATED APPLICATION

Not Applicable

BACKGROUND OF THE INVENTION

1. Field of the Invention

The present invention relates to a method and apparatus for rejacketing of stripped carriers of electromagnetic energy and the product obtained thereby and, in particular, to rejacketing of optical fibers, such as glass and plastic-based fibers.

While the present invention is applicable, in general, to rejacketing of carriers of electromagnetic energy, it was specifically developed and directed to optical fibers. However, for purposes of describing the present invention, discussion will be directed specifically to optical fibers. Nonetheless, it is to be understood that the present invention is not to be limited thereto but, in general, to other forms of carriers of electromagnetic energy.

2. Description of Related Art and Other Considerations

Splicing of optical fibers requires that protective insulative jackets be stripped from each optical fiber to permit their exposed ends to be spliced together. Thereafter, the spliced fibers must again be rejacketed. Prior techniques and the resulting products, while generally competent to provide an effective rejacketing, have problems. Most employ curing of light sensitive jacketing material by photo curing, e.g., by ultra-violet and blue light.

Conventional rejacketing methods may be divided into two categories, viz., one not needing a mold and one that uses a mold, either rigid or soft. The non-mold techniques utilize some form of mechanical connector, such as a heat-produced shrink fitting, which is large in size and bulky. The new jacket is also bulky. However, it is fast and rugged. The mold-using methods are difficult to assemble and are hard to automate. Further, some hard molds have holes which become clogged with cured jacketing material and which, therefore, need to be periodically cleaned. Soft molds wear out faster than hard molds and, therefore, need frequent replacement. However, their advantage over hard molds is that they are easier to clean. Known methods are discussed as follows.

In the "Silicone Mold" method, while the molds do not damage the fiber and fairly consistent rejacketing results, the molds need to be replaced often, the method presents difficulties in being automated, and bubbles need to be removed.

The "Vytran Glass Die" method produces very consistent rejacketing and is not subject to wear; however, it is imperative that the spliced fibers and associated jackets be clean and the use of epoxy provides loading difficulties.

It is easy to set up the "Dip and Cure" method, which does not require a mold. However, the cure must be quick to minimize beading of epoxy on the fiber and the new jacket may not be uniform. Further, this process requires the ability to automatically dip the fiber into the epoxy.

The "Brush and Cure" method is very easy to set up and requires no mold. However, the cure needs to be quick to minimize beading of epoxy on the fiber, the jacket is not uniform, and the fiber must be contacted with a brush.

The "Pull Through a Drop/cure" process is also easy to set up and does not require a mold or, furthermore, any contact with the fiber. Its deficiencies include the need for a quick cure to minimize beading of epoxy on the fiber and the new jacket is not uniform.

In the "Spray" method, no mold is required and the fiber is not subject to contact. Like some of the other processes, the cure needs to be quick to minimize beading of epoxy on the fiber, the rejacketing is not uniform, and good environmental containment is needed.

In moldless processes, beading often is produced. When used, molds add cost and complexity.

SUMMARY OF THE INVENTION

These and other problems are successfully addressed and overcome by the present invention comprising a method and the product obtained thereby, which does not require the use of a mold. The starting point in the rejacketing method begins with optical fibers (or any other carriers of electromagnetic energy) from which a portion of their respective original jackets has been removed, e.g., for enabling them to have been spliced in any appropriate manner. The spliced optical fibers comprise spliced together bared fibers extending from their existing, stripped away respective jackets. A first applied jacketing or protective material is placed onto essentially half of the bared fibers from and between the surrounding protective jackets. A second applied protective material or jacket is then placed in bonded contact with the first applied material from and between the surrounding protective jackets and onto essentially the remaining half of the bared fibers.

In its preferred embodiment, the insulating material or jacketing comprises a light curable jacketing material which is exposed to ultraviolet light. This material is dispensed through a small orifice or syringe which is fed from a reservoir to deposit the rejacketing material onto the spliced fibers. The light source is positioned adjacent the orifice. The relative motions of the orifice and the fibers are capable of coating the fibers with a uniform thickness of rejacketing material with the required length. This process is controlled by varying a number of parameters, namely the relative motion and speed, the flow rate of the rejacketing or adhesive material from the orifice, the shape and size of the orifice, the viscosity of the adhesive, and the curing speed of the adhesive. The curing speed is controlled, in turn, in the case of UV light curing, for example, by the power of the curing light, the distance from the adhesive from the light or light delivery system, the time of cure, and the speed of motion of the light over the curing area.

A key feature of the present invention is the use of a double coat of ultraviolet or other light curable adhesive placed on opposite sides of the fiber. This double coating is effected by rotating the fiber about its axis for subsequent coating or coating layers. The controlled sequencing of this coating process yields a seamless uniform coating around the fiber for rejacketing purposes.

Several advantages are derived from this arrangement. The process does not require the use of molds and, therefore, avoids the several cost and cleaning problems associated therewith. The spliced fiber product is provided with a seamless uniform coating. The diameter of the rejacketed material is nearly the same that of as the original jacket and, therefore, is both aesthetically pleasing in appearance, and nearly as flexible as unspliced portions of the fiber. The rejacketing process is fast, is easily automated and is low in cost as compared to conventional systems. The mechanism for holding the optical fibers to accomplish the splicing can be used also for the rejacketing.

Other aims and advantages, as well as a more complete understanding of the present invention, will appear from the following explanation of an exemplary embodiment and the accompanying drawings thereof.

BRIEF DESCRIPTION OF THE DRAWINGS

FIG. 1 is a view of a pair of newly spliced optical fibers from which their jacket material had previously been stripped in preparation for the splicing.

FIG. 1a is a view in cross-section of the optical fibers shown in FIG. 1 taken along line 1a—1a thereof.

FIG. 2 is a view of the spliced optical fibers to which a first recoating of jacket material has been applied to one-half of the spiced fibers.

FIG. 2a a view in cross-section of the optical fibers shown in FIG. 2 taken along line 2a—2a thereof.

FIG. 3 is a view of the spliced optical fibers to which a second, and fiber recoating of jacket material has been applied to one-half of the spiced fibers.

FIG. 3a is a view in cross-section of the optical fibers shown in FIG. 3 taken along line 3a—3a thereof and, for purposes only of understanding, the two applied coatings are shaded differently. However, in actuality, there is no demarcation or detectable appearance between the two.

FIG. 4 is a view of the spliced optical fibers in apparatus for applying jacketing material thereto immediately after the splicing operation. The spliced optical fibers are rotated 90° from that shown before any rejacketing material is applied.

DETAILED DESCRIPTION OF THE PREFERRED EMBODIMENTS

Figure 5:
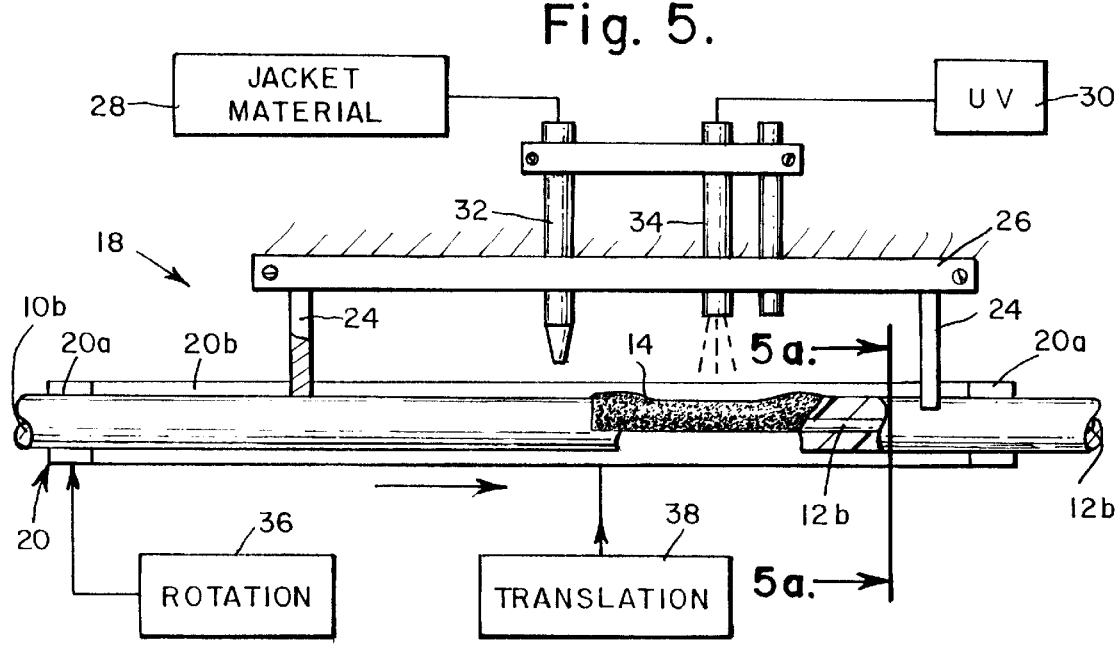
FIG. 5 is a view of the spliced optical fibers in the rejacketing apparatus, but turned 90° from that depicted in FIG. 4, to illustrate that new jacketing material has been applied to essentially a first half portion of the spliced optical fibers.

As shown in FIGS. 1–3 and in their FIGS. 1a–3a cross-sections, a pair of jacketed optical fibers 10 and 12 respectively include jackets 10a and 12a protectively covering their fibers 10b and 12b. Fibers 10b and 12b are spliced together at their ends 10c and 12c in any conventional manner. To enable the splicing have taken place, portions of existing jackets were removed to produce bared or stripped away fiber portions 10d and 12d, as illustrated in FIGS. 1 and 1a. In the practice of the present inventive method, as illustrated in FIGS. 2 and 2a, a first application of protective insulating material 14 is applied to and between existing surrounding jackets 10a to 12a and onto essentially the upper half (as viewed in the drawings) or longitudinally extending half side or part of bared portions 10d and 12d.

In accordance with the preferred embodiment of the present invention, after the first application of protective material 14 has been applied, fibers 10 and 12 are rotated 180° from their position shown in FIGS. 1 and 1a in order that a second application of protective material may be applied to the lower or longitudinally extending half side or part of portions 10d and 12d having the first applied material 14 thereon. It is to be understood, however, that the second application of jacket material could be applied to the underside of bared portions 10d and 12d; however, this alternate approach is less preferred, as further description proceeds with respect to FIGS. 4–6.

Accordingly, as illustrated in FIGS. 3 and 3a, a second application of insulating material 16 is applied in bonded contact with first applied material 14 to and between surrounding protective jackets 10a to 12a and onto essentially the remaining or remainder of the longitudinally extending parts or half of bared portions 10d and 12d. As stated above with respect to the description of the drawings, for purposes only of understanding, the two applied coatings (14, 16) are shaded differently; however, in actuality, there is no physical distinction between the two and, if the method has been carefully practiced, any demarcation between the two coatings should not exist or be detected.

Figure 4A:
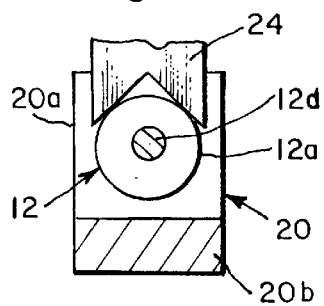
FIG. 4a is a view in cross-section of the optical fibers and existing jacket material as shown in FIG. 4, taken along line 4a—4a thereof, and a portion of the apparatus holder for holding and positioning both spliced optical fibers securely and accurately in the rejacketing apparatus.

Reference is now made to FIGS. 4 and 4a, which depict spliced fibers 10 and 12 held in readiness for rejacketing within a rejacketing apparatus 18. In practicing the present invention, it is intended that the fibers be rejacketed immediately after their ends 10c and 12c have been spliced. To enable the splicing, fibers 10 and 12 will have had to have been firmly held within a holder by their existing jackets 10a and 12a somewhat adjacent to stripped cores 10d and 12d. To avoid breakage or other damage to the newly spliced fibers, they are retained in this same holder which, therefore, is identified by indicium 20 in FIGS. 4–6.

Holder 20 includes a pair of spaced clamps 20a which are securely joined together by a bar 20b. Spaced clamps 20a respectively hold jackets 10a and 12a firmly and, therefore, hold the fibers stationary with respect to one another at their spliced ends 10c and 12c. Because clamps 20a are somewhat spaced from one another, a pair of V-shaped guides 24, which are secured to a fixed portion 26 of apparatus 18, are spatially positioned, relative to spliced ends 10c and 12c, to ensure their stability from damaging motion.

A reservoir 28 of uncured jacket material and a source 30 of ultraviolet or other curing light are positioned close to apparatus fixed portion 26. Reservoir 28 is coupled by a conduit to a syringe 32 for supply of the uncured jacket material to fiber portions 10d and 12d. Syringe 32 may comprise any other suitable device. Light source 30 is coupled to a light-directing element or rod 34 for directing the curing light onto the jacket material deposited onto fiber portions 10d and 12d. Syringe 32 and light supply rod 34 are secured to portion 26.

Fiber holder 20 is translatable and rotatable with respect to syringe 32 and light supply rod 30, respectively by a rotation mechanism 36 and a translation mechanism 38. Thus, the fibers and their spliced portions 10*d* and 12*d* can be rotated and linearly moved with respect to syringe 32 and light supply rod 34.

Figure 5A:
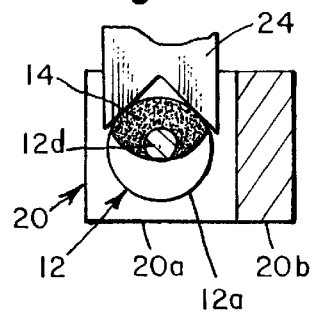
FIG. 5a is a view in cross-section, taken along line 5a—5a of FIG. 5, of the optical fibers, jacket material applied thereto, and a portion of the apparatus holder for holding both spliced optical fibers securely and accurately in the rejacketing apparatus.

As introduction to further description of the present invention, it will be useful to briefly orient the reader with respect to rotation of the holder. The initial position of holder 20 and fibers 10 and 12 are shown in FIGS. 4 and 4*a* with holder bar 20*b* positioned directly below reservoir syringe 32 and light supply rod 34. For the first application of the curable material, as depicted in FIGS. 5 and 5*a*, the holder is turned 90° with respect to the reservoir syringe and the light supply rod; thus, holder bar 20*b* is shown at a position to one side of reservoir syringe 32 and light supply rod 34. For the second application of the curable material, as depicted in FIGS. 6 and 6*a*, the holder is turned 180° with respect to the reservoir syringe and the light rod, that is, holder bar 20*b* in FIGS. 6 and 6*a* is shown at a position to the reservoir syringe and light element side opposite to that illustrated in FIGS. 5 and 5*a*.

Accordingly, referring back to FIGS. 4 and 4*a*, directly after fiber ends 10*c* and 12*c* have been joined in the splicing apparatus, the optical fibers as held in holder 20 are moved as a unit from the splicing apparatus to rejacketing apparatus 18 so as not to disturb the newly formed splice. The optical fibers are so placed with respect to syringe 32 and light supply rod 34 that bared fiber portions 10*d* and 12*d* are positioned in an initial or first position before the reservoir syringe which, in turn, is located above the terminus of stripped jacket 12*a*.

At this point, holder 20 is turned 90° by rotation mechanism 36 so that holder bar 20*b* rotates from its position shown to FIG. 4*a* to that shown in FIG. 5*a*. The appearance of the fibers corresponds to that illustrated in FIGS. 1 and 1*a*. The holder is then caused to move linearly by translation mechanism 38 to the right, as depicted in the drawings, to the position illustrated in FIG. 5, during which time a predetermined amount of curable jacketing material is deposited essentially on one-half of bared portions 10*d* and 12*d* and from and between jackets 10*a* and 12*a* and partially cured or set through exposure to curing light from light supply rod 34. The appearance of the fibers corresponds to that illustrated in FIGS. 2 and 2*a*.

Figure 6A:
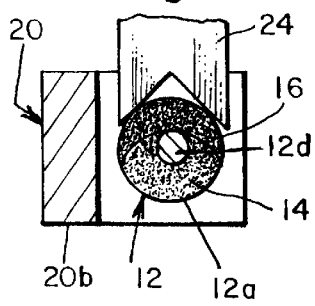
FIG. 6a is a view in cross-section, taken along line 6a—6a of FIG. 6, of the optical fibers, jacket material applied thereto, and a portion of the apparatus holder for holding both spliced optical fibers securely and accurately in the rejacketing apparatus.
Figure 6:
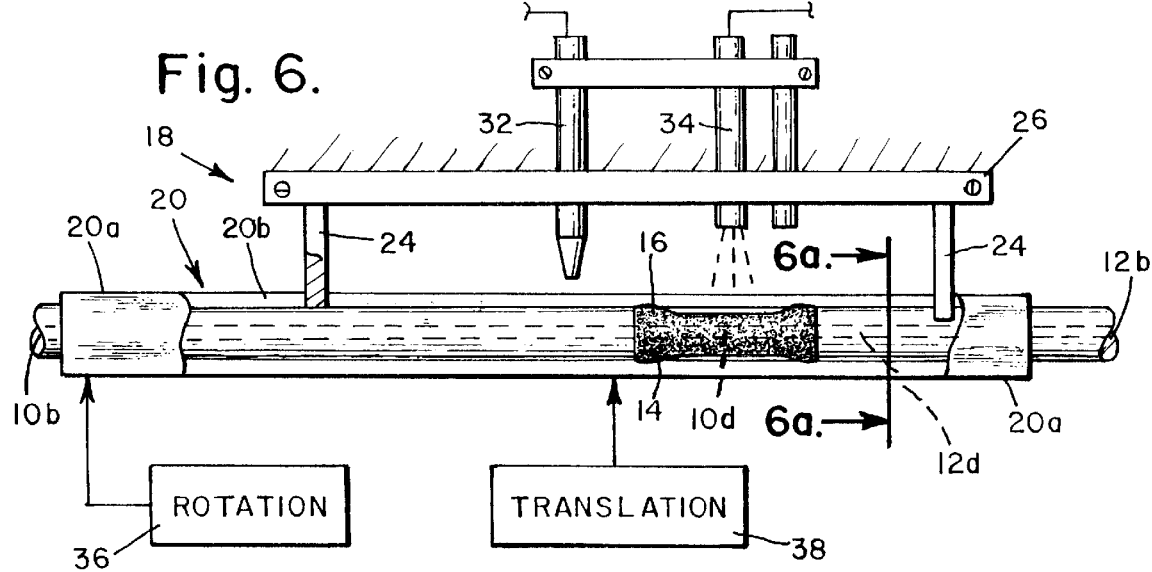
FIG. 6 is a view of the spliced optical fibers in the rejacketing apparatus, but turned 180° from that depicted in FIG. 5, for applying essentially a second half portion of jacketing material thereto.

Holder 20 is turned 180° by rotation mechanism 36 so that holder bar 20*b* rotates from its position shown to FIG. 5*a* to that shown in FIG. 6*a*. In addition, the holder and fibers retained therein are linearly moved to their initial or first position similar to that as shown in FIG. 4 excepting for their rotational orientation. The holder is then caused again to move linearly by translation mechanism 38 to the right to the position illustrated in FIG. 6, during which time a further predetermined amount of curable jacket material is deposited essentially on the remaining half of bared portions 10*d* and 12*d* and from and between jackets 10*a* and 12*a*. The material is fully cured or set through sufficient exposure to curing light from light supply rod 34. The appearance of the fibers corresponds to that illustrated in FIGS. 3 and 3*a*.

As stated above, this process is controlled by varying such parameters as the relative motion and speed between holder 20 and its retained fibers 10 and 11 with respect to syringe 32 and light element 34, the flow rate of the rejacketing or adhesive material from the syringe orifice, the shape and size of the orifice, the viscosity of the adhesive, and the curing speed of the adhesive. The curing speed is controlled, in turn, in the case of UV light curing, for example, by the power of the curing light, the distance from the adhesive from the light or light delivery system, the time of cure, and the speed of motion of the light over the curing area.

Although the invention has been described with respect to a particular embodiment thereof, it should be realized that various changes and modifications may be made therein without departing from the spirit and scope of the invention.

What is claimed is:

1. A method for rejacketing spliced carriers of electromagnetic energy in which first and second carriers of electromagnetic energy have existing surrounding protective jackets of protective material and spliced together bared portions extending from the respective jackets to enable transfer of electromagnetic energy between the carriers, comprising the steps of:

holding the spliced together bared portions in fixed relationship with one another;

positioning a dispenser of protective material adjacent one of the surrounding protective jackets;

moving the bared portions and the dispenser relative to one another while dispensing protective material onto the bared portions from the one to the other of the surrounding protective jackets onto essentially half of the bared portions;

turning the bared portions with the first applied material in at least a 180° arc with respect to the dispenser; and moving the bared portions with the first applied material thereon and the dispenser relative to one another while dispensing protective material onto the remaining half of the bared portions and the first applied material, from one to the other of the surrounding protective jackets.

2. The method according to claim 1 wherein the jacketed carriers comprise optical fibers and the protective material comprises a curable jacket material.

3. A method for rejacketing spliced carriers of electromagnetic energy in which first and second carriers of electromagnetic energy have existing surrounding protective jackets of protective material and spliced together bared portions extending from the respective jackets to enable transfer of electromagnetic energy between the carriers, comprising the steps of:

holding the spliced together bared portions in fixed relationship with one another;

positioning a dispenser of protective material adjacent one of the surrounding protective jackets;

turning the held spliced together bared portions 90° with respect to the dispenser;

moving the bared portions and the dispenser relative to one another while dispensing protective material onto the bared portions from the one to the other of the surrounding protective jackets on essentially half of the bared portions;

turning the bared portions with the first applied material 180° with respect to the dispenser; and moving the bared portions with the first applied material thereon and the dispenser relative to one another while dispensing protective material onto the remaining half of the bared portions and the first applied material, from a first of the surrounding protective jackets to the other of the surrounding protective jackets.

4. The method according to claim 3 wherein the jacketed carriers comprise optical fibers and the protective material comprises a curable jacketing material.

5. A method for rejacketing spliced carriers of electromagnetic energy in which first and second optical fibers have existing surrounding protective jackets of a light curable jacketing material and have spliced together bared portions extending from the respective jackets to enable transfer of electromagnetic energy between the optical fibers, comprising the steps of:

holding the spliced together bared optical fiber portions in fixed relationship with one another;

positioning a dispenser of light curable jacketing material adjacent one of the surrounding protective jackets;

positioning a source of curing light adjacent to the dispenser;

moving the bared portions and the dispenser relative to one another from a first position while dispensing the light curable jacketing material onto the bared portions from the one to the other of the surrounding protective jackets on essentially half of the bared portions and applying light onto the dispensed light curable jacketing material;

returning the bared portions with the first applied material to the first position;

turning the bared portions with the first applied material 180° with respect to the dispenser and the light source; and moving the bared portions with the first applied material thereon and the adjacently-positioned dispenser and light source relative to one another while dispensing additional light curable jacketing material onto the remaining half of the bared portions and the first applied material, from the one to the other of the surrounding protective jackets.

6. A method for rejacketing spliced carriers of electromagnetic energy in which first and second optical fibers have existing surrounding protective jackets of a light curable jacketing material and have spliced together bared portions extending from the respective jackets to enable transfer of electromagnetic energy between the optical fibers, comprising the steps of:

holding the spliced together bared optical fiber portions in fixed relationship with one another;

positioning a dispenser of light curable jacketing material adjacent the first of the surrounding protective jackets;

positioning a source of curing light adjacent to the dispenser;

turning the held spliced together bared portions 90° with respect to the dispenser;

moving the bared portions and the dispenser relative to one another from a first position while dispensing the light curable jacketing material onto the bared portions from the one to the other of the surrounding protective jackets on essentially half of the bared portions and applying light onto the dispensed light curable jacketing material;

turning the bared portions with the first applied material 180° with respect to the dispenser and the light source; and moving the bared portions with the first applied material thereon and the adjacently-positioned dispenser and light source relative to one another while dispensing additional light curable jacketing material onto the remaining half of the bared portions and the first applied material, from the one to the other of the surrounding protective jacketing material.

7. A method for rejacketing spliced optical fibers in which first and second optical fibers have existing surrounding protective jacketing and spliced together bared optical fiber ends extending from the respective jacketing to enable transfer of light between the carriers, comprising the steps of:

holding the existing jacketing within a holder to maintain the spliced together bared optical fiber ends in fixed relationship with one another;

positioning a first of the surrounding protective jacketing adjacent to a dispenser of light curable jacketing material at a first position;

positioning a source of curing light in fixed adjacent position with respect to the dispenser;

turning the holder and the spliced together bared ends 90° with respect to the dispenser and the light source;

moving the holder and the bared ends with respect to the dispenser and the light source from the first position while dispensing the light curable jacketing material onto essentially one side of the bared ends from the first to the other of the surrounding protective jacketing and applying light onto and partially curing the dispensed light curable jacketing material;

turning the holder and the bared ends with the first applied material 180° with respect to the dispenser and the light source and returning the holder and the bared ends with the first applied material to the first position to expose the other side of the bared ends to the dispenser and the light source;

moving the holder and the bared ends with the first applied material thereon with respect to the adjacently positioned dispenser and light source while dispensing additional light curable jacketing material onto the other side of the bared ends and the first applied material, from the first to the other of the surrounding protective jacketing; and permitting all of the light curable jacketing material to cure.

* * * * *